United States Patent
Yin et al.

(10) Patent No.: US 11,920,986 B2
(45) Date of Patent: Mar. 5, 2024

(54) SEWER PIPE INFLOW AND INFILTRATION DIAGNOSIS METHOD BASED ON DISTRIBUTED FIBER-OPTIC TEMPERATURE MEASUREMENT SYSTEM

(71) Applicant: TONGJI UNIVERSITY, Shanghai (CN)

(72) Inventors: Hailong Yin, Shanghai (CN); Zuxin Xu, Shanghai (CN); Longtian Guo, Shanghai (CN); Ming Xie, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 18/273,554

(22) PCT Filed: Aug. 10, 2021

(86) PCT No.: PCT/CN2021/111832
§ 371 (c)(1),
(2) Date: Jul. 21, 2023

(87) PCT Pub. No.: WO2022/179057
PCT Pub. Date: Sep. 1, 2022

(65) Prior Publication Data
US 2023/0408345 A1     Dec. 21, 2023

(30) Foreign Application Priority Data

Feb. 26, 2021   (CN) .......................... 202110217427.7

(51) Int. Cl.
*G01K 11/32*    (2021.01)
*F16L 55/28*    (2006.01)
*F16L 101/30*   (2006.01)

(52) U.S. Cl.
CPC .............. *G01K 11/32* (2013.01); *F16L 55/28* (2013.01); *F16L 2101/30* (2013.01)

(58) Field of Classification Search
CPC ........ G01K 11/32; G01K 1/024; G01K 1/026; F16L 55/28; F16L 2101/30; Y02A 20/20
See application file for complete search history.

(56) References Cited

U.S. PATENT DOCUMENTS

| 2009/0132183 A1* | 5/2009 | Hartog | G01K 11/32 |
| | | | 702/42 |
| 2011/0186203 A1* | 8/2011 | Lindner | B32B 37/02 |
| | | | 156/64 |

(Continued)

FOREIGN PATENT DOCUMENTS

| CN | 103314276 A * | 9/2013 | ......... G01D 5/35364 |
| CN | 205209700 U | 5/2016 | |

(Continued)

*Primary Examiner* — Mohamed K Amara
(74) *Attorney, Agent, or Firm* — Bayramoglu Law Offices LLC

(57) ABSTRACT

A sewer pipe inflow and infiltration diagnosis method based on a distributed fiber-optic temperature measurement system is provided. The inflow and infiltration diagnosis method includes the following steps: S1: transmitting, by an optical time-domain reflectometer, an original optical signal to a temperature sensing fiber-optic cable provided in a sewer pipe; S2: feeding back, by the temperature sensing fiber-optic cable, a modulated optical signal to the optical time-domain reflectometer due to a temperature effect; S3: subjecting the modulated optical signal to photoelectric conversion, so as to acquire binary information; S4: converting the binary information into decimal information; S5: drawing a spatiotemporal map of a water temperature; and S6: eliminating a background noise value, identifying an abnormal water temperature point, determining an inflow (Continued)

and infiltration point of the sewer pipe, and determining an abnormal inflow and infiltration point of the sewer pipe.

9 Claims, 5 Drawing Sheets

(56) References Cited

U.S. PATENT DOCUMENTS

| | | | | |
|---|---|---|---|---|
| 2015/0063418 | A1* | 3/2015 | Wysocki | E21B 47/135 |
| | | | | 374/161 |
| 2015/0146759 | A1* | 5/2015 | Johnston | E21B 47/07 |
| | | | | 374/117 |
| 2019/0338621 | A1* | 11/2019 | Jin | G01K 7/427 |
| 2023/0287766 | A1* | 9/2023 | Jin | E21B 36/005 |
| | | | | 166/250.01 |

FOREIGN PATENT DOCUMENTS

| | | |
|---|---|---|
| CN | 105805556 A | 7/2016 |
| CN | 107101743 A | 8/2017 |
| CN | 107607265 A | 1/2018 |
| CN | 108317402 A | 7/2018 |
| CN | 110333673 A | 10/2019 |
| CN | 113029382 A | 6/2021 |

* cited by examiner

SEWER PIPE INFLOW AND INFILTRATION DIAGNOSIS METHOD BASED ON DISTRIBUTED FIBER-OPTIC TEMPERATURE MEASUREMENT SYSTEM

CROSS REFERENCE TO THE RELATED APPLICATIONS

This application is the national phase entry of International Application No. PCT/CN2021/111832, filed on Aug. 10, 2021, which is based upon and claims priority to Chinese Patent Application No. 202110217427.7, filed on Feb. 26, 2021, the entire contents of which are incorporated herein by reference.

TECHNICAL FIELD

The present disclosure relates to the field of sewer pipe inflow and infiltration diagnosis, and in particular, to a sewer pipe inflow and infiltration diagnosis method based on a distributed fiber-optic temperature measurement system.

BACKGROUND

The sewer system is the lifeline of a city and an indispensable infrastructure for preventing urban waterlogging and improving the quality of urban water environment. In recent years, with the acceleration of urbanization, the length of sewer pipes in China has reached 600,000 kilometers. However, the sewer system has problems such as the combination of stormwater and sewage, sewer pipe damage, and others. These problems lead to a decrease in the collection efficiency of the sewer system, an increase in the operating energy consumption of the sewage plant, and deterioration of river water quality due to sewer overflows. In southern China, where the groundwater level is high, it is estimated that 20-39% of the dry weather water in the sewer pipe is from external sources such as groundwater. In addition, the overflow of the stormwater and sewage combined sewer pipe is a big problem, which will result in a black-odorous river during rainy days.

To improve the efficiency of the sewer system, it is first necessary to conduct testing and evaluation of the sewer system, so as to adopt targeted renovation and repair measures. At present, closed-circuit television (CCTV) is the most commonly used sewer pipe detection technology. However, it requires operations such as plugging, emptying, dredging, and the like, and the cost of pipe testing per kilometer reaches 50,000-250,000 yuan, which is a high cost. In addition, the main sewer pipe operating at a high water level cannot be plugged and emptied, making it hard to implement CCTV detection.

SUMMARY

In order to overcome the defects of the prior art, an objective of the present disclosure is to provide a sewer pipe inflow and infiltration diagnosis method based on a distributed fiber-optic temperature measurement system.

The objective of the present disclosure can be achieved by the following technical solution:

In the sewer pipe inflow and infiltration diagnosis method based on a distributed fiber-optic temperature measurement system, the distributed fiber-optic temperature measurement system includes an optical time-domain reflectometer, a data interpretation module, a temperature sensing fiber-optic cable, and a distributed fiber-optic temperature measurement instrument, where the inflow and infiltration diagnosis method includes the following steps:

S1: transmitting, by the optical time-domain reflectometer, an original optical signal to the temperature sensing fiber-optic cable provided in a sewer pipe;

S2: feeding back, by the temperature sensing fiber-optic cable, a modulated optical signal to the optical time-domain reflectometer due to a temperature effect;

S3: subjecting, by the distributed fiber-optic temperature measurement instrument, the modulated optical signal to photoelectric conversion, so as to acquire binary information characterizing a measurement time, a measured temperature, and a fiber location;

S4: converting, by the data interpretation module, the binary information into decimal information;

S5: drawing a spatiotemporal map of a water temperature inside the sewer pipe based on the decimal information; and S6: eliminating a background noise value in the spatiotemporal map of the water temperature, identifying an abnormal water temperature point, determining an inflow and infiltration point of the sewer pipe, determining an abnormal inflow and infiltration point of the sewer pipe, and further analyzing data of the abnormal inflow and infiltration point to acquire inflow and infiltration information of the sewer pipe.

Preferably, the decimal information includes the measurement time denoted by t, the measured temperature denoted by T, and the fiber location denoted by l; and step S5 includes: drawing the measured temperature T in different colors in a coordinate system with the measurement time t as a vertical axis and the fiber location l as a horizontal axis, so as to form the spatiotemporal map of the water temperature inside the sewer pipe.

Preferably, step S6 includes: eliminating the background noise value in the spatiotemporal map of the water temperature as follows:

setting a positive background noise value a° C. (a>0), and eliminating the positive signal background noise value according to the positive background noise value elimination equation below:

$$X(t, l) = \begin{cases} 1, & T(t, l) - T(t, l-1) \geq a \\ 0, & T(t, l) - T(t, l-1) < a \end{cases}$$

where, t denotes the measurement time; l denotes the fiber location; On denotes a positive response event matrix with elements 0 and 1; T(t,l) denotes a water temperature matrix of a temperature measurement point defined by the fiber location l; and T(t,l−1) denotes a water temperature matrix of a temperature measurement point defined by a fiber location l−1;

setting a negative background noise value b° C. (b<0), and eliminating the negative signal background noise value according to a negative background noise value elimination equation below:

$$X'(t, l) = \begin{cases} -1, & T(t, l) - T(t, l-1) \leq b \\ 0, & T(t, l) - T(t, l-1) > b \end{cases}$$

where, X'(t,l) denotes a negative response event matrix with elements 0 and −1;

expressing the spatiotemporal map of the water temperature by 0, −1, and 1 after eliminating the positive signal background noise value according to the positive signal background noise value elimination equation and the negative signal background noise value according to the negative signal background noise value elimination equation, where −1 and 1 denote the abnormal water temperature point and an abnormal discharge time, respectively.

Preferably, step S6 includes: determining the positive background noise value and the negative background noise value based on a temperature variation amplitude.

Preferably, the positive background noise value and the negative background noise value are expressed as follows:

$$a = |\overline{T} - T_{max}|$$
$$b = -|\overline{T} - T_{min}|$$

where, $\overline{T}$ denotes an average measured temperature during an observation period; $T_{max}$ denotes a maximum measured temperature during the observation period; and $T_{min}$ denotes a minimum measured temperature during the observation period.

Preferably, step S6 includes: determining the positive background noise value and the negative background noise value based on a probability distribution of a water temperature difference between two adjacent points in space.

Preferably, the positive background noise value and the negative background noise value are expressed as follows:

$$a = \varphi$$
$$b = -\varphi$$

where, φ denotes a preset background noise value with a probability distribution proportion $P_\varphi$ greater than a set distribution proportion $P^{set}$, that is, $P_\varphi > P^{set}$.

Preferably, the probability distribution proportion of the preset background noise value is expressed as follows:

$$P_\varphi = \left(\frac{k}{k_{total}}\right) \times 100\%$$

where, k denotes a number of times that an element in a temperature difference matrix Γ(t,l−1) appears within (−φ,φ), Γ(t,l−1)=T(t,l)—T(t,l−1); $k_{total}$ denotes a total number of positive and negative temperature differences between two adjacent points in a pipe space during the observation period, $k_{total}$=m×(n−1); m denotes a number of rows in the water temperature matrix T(t,l); and n denotes a number of columns in the water temperature matrix T(t,l).

Preferably, the optical time-domain reflectometer includes an optical signal transmitting module and an optical signal receiving module; the optical signal transmission module is configured to generate and transmit the original optical signal to the temperature sensing fiber-optic cable; and the optical signal receiving module is configured to receive the modulated optical signal from the temperature sensing fiber-optic cable.

Preferably, the sewer pipe includes a storm pipe, a sewage pipe, and a storm and sewage combined pipe.

Compared with the prior art, the present disclosure has the following advantages: The present disclosure is based on the structural characteristics of the distributed fiber-optic temperature measurement system, and can be used for high-frequency continuous monitoring in high water level operations. The present disclosure features low cost and precise positioning, making it easy to promote and apply on a large scale. The present disclosure accurately acquires the temperature information of the sewer pipe, and draws the spatiotemporal map of the water temperature based on the temperature information of the sewer pipe. Based on the spatiotemporal map of the water temperature, the present disclosure determines the positive and negative background noise values, and effectively eliminates the background noise values in the spatiotemporal map of the water temperature. On this basis, the present disclosure accurately acquires the response event matrix, and determines the inflow and infiltration point of the sewer pipe, thus improving the diagnostic efficiency and accuracy of inflow and infiltration into the sewer pipe.

DETAILED DESCRIPTION OF THE EMBODIMENTS

The present disclosure will be described in detail below with reference to the drawings and specific embodiments. It should be noted that the description of following implementations is merely a substantial example, and the present disclosure is neither intended to limit its application or use, nor being limited to the following implementations.

Embodiment

The embodiment of the present disclosure provides a sewer pipe inflow and infiltration diagnosis method based on a distributed fiber-optic temperature measurement system. Considering a water temperature difference between external water and water inside a sewer pipe, the present disclosure provides a fiber-optic cable inside the sewer pipe to monitor an abnormal temperature point, and identifies the abnormal temperature point as storm and sewage combined point or a damage point. The distributed fiber-optic temperature measurement system includes an optical time-domain reflectometer, a data interpretation module, a temperature sensing fiber-optic cable, and a distributed fiber-optic temperature measurement instrument. The optical time-domain reflectometer includes an optical signal transmitting module and an optical signal receiving module. The optical signal transmission module is configured to generate and transmit the original optical signal to the temperature sensing fiber-optic cable. The optical signal receiving module is configured to receive the modulated optical signal from the temperature sensing fiber-optic cable. The temperature sensing fiber-optic cable is provided in the sewer pipe, and is able to sensitively respond to a water temperature variation inside the sewer pipe. The distributed fiber-optic temperature measurement instrument is configured to subject the modulated optical signal to photoelectric conversion, so as to acquire binary information characterizing a real-time spatiotemporal water temperature variation inside the sewer pipe. The data interpretation module is configured to convert the binary information into decimal information for subsequent drawing of a spatiotemporal map of a water temperature inside the sewer pipe and determination of an inflow and infiltration point.

Figure 1:
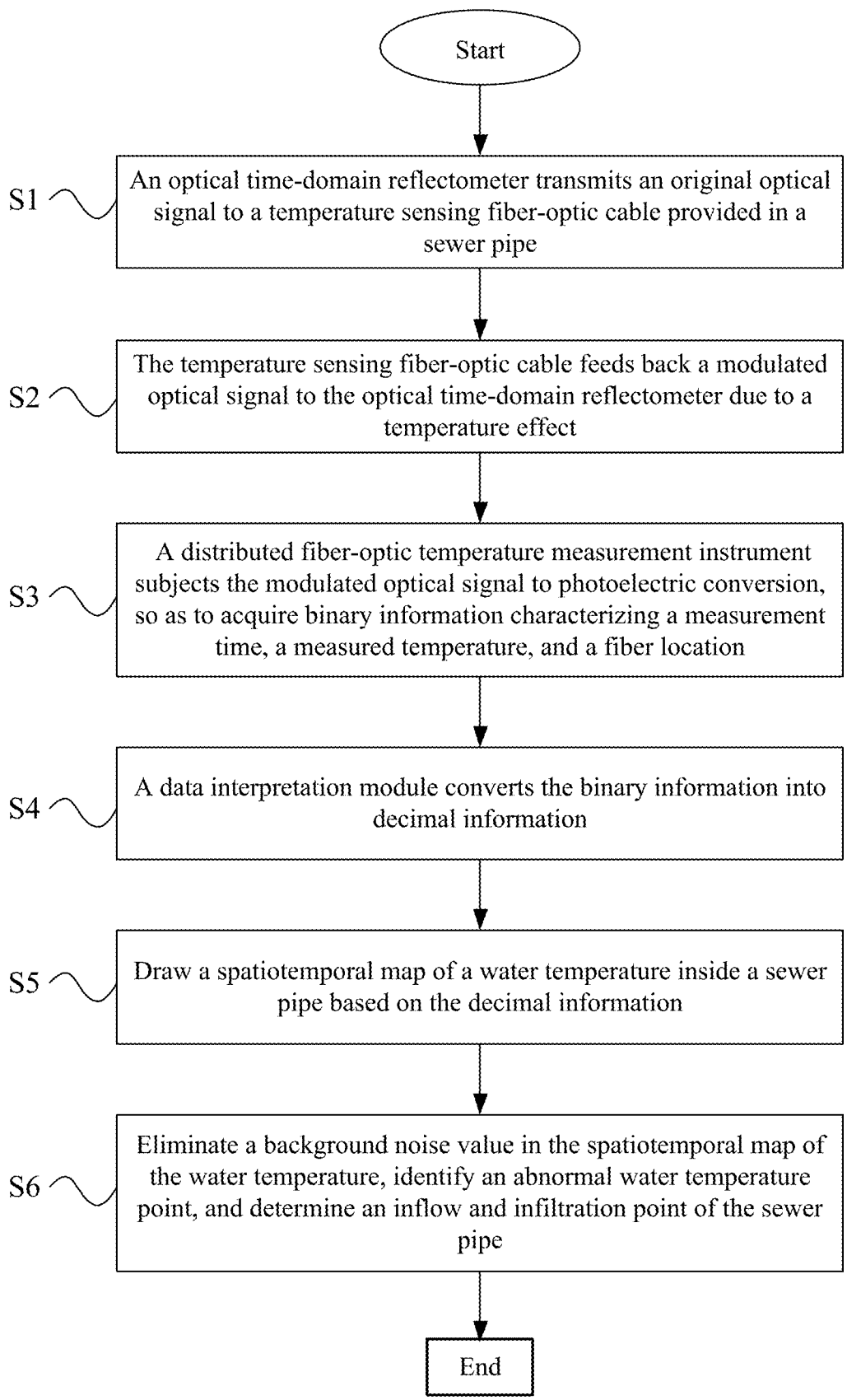
FIG. 1 is a flowchart of a sewer pipe inflow and infiltration diagnosis method based on a distributed fiber-optic temperature measurement system according to the present disclosure.
Figure 2:
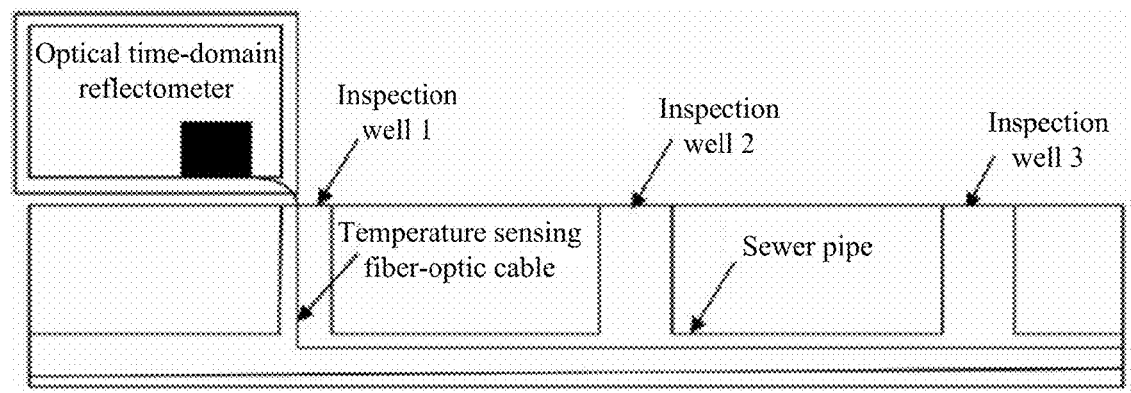
FIG. 2 is a schematic diagram of site layout of the distributed fiber-optic temperature measurement system according to an embodiment of the present disclosure.
Figure 3:
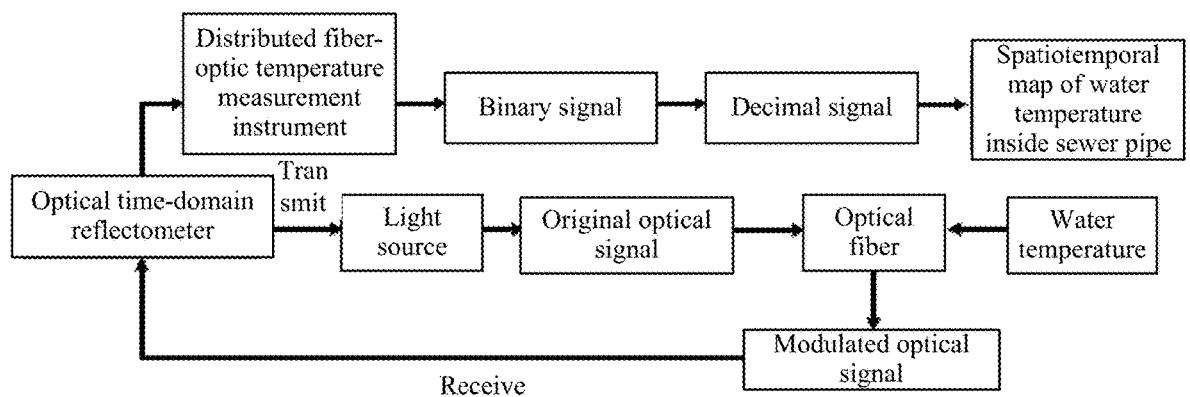
FIG. 3 is a flowchart of information transmission according to the present disclosure.

The sewer pipe includes a storm pipe, a sewage pipe, and a storm and sewage combined pipe. The shape of the sewer pipe is not limited, and the sewer pipe can be a circular pipe, a square culvert, or an elliptical pipe. The temperature sensing fiber-optic cable can be installed between two inspection wells of the sewer pipe along an extended direction of the sewer pipe. When the temperature sensing fiber-optic cable is installed on the sewer pipe, it is not necessary to lower the water level in the sewer pipe. In this embodiment, as shown in FIG. 2, the distributed fiber-optic temperature measurement system is provided with three inspection wells on the sewer pipe.

The inflow and infiltration diagnosis method includes: continuous measurement of the water temperature inside the sewer pipe based on the distributed fiber-optic temperature measurement system, interpretation of a water temperature signal, drawing of a spatiotemporal map of the water temperature inside the sewer pipe, and identification of an inflow and infiltration point of the sewer pipe. The inflow and infiltration diagnosis method specifically includes the following steps.

S1. The optical time-domain reflectometer transmits an original optical signal to the temperature sensing fiber-optic cable provided in a sewer pipe.

S2. The temperature sensing fiber-optic cable feeds back a modulated optical signal to the optical time-domain reflectometer due to a temperature effect.

Specifically, in this embodiment, the continuous measurement of the water temperature inside the sewer pipe is completed through steps S1 and S2. The temperature sensing fiber-optic cable is installed along the extended direction of the sewer pipe. When the temperature sensing fiber-optic cable is installed, the temperature sensing fiber-optic cable should avoid bending as much as possible. A continuous measurement time of the water temperature inside the sewer pipe should not be less than 48 hours.

S3. The distributed fiber-optic temperature measurement instrument subjects the modulated optical signal to photoelectric conversion, so as to acquire binary information characterizing a measurement time, a measured temperature, and a fiber location.

The distributed fiber-optic temperature measurement instrument is configured to subject the modulated optical signal to photoelectric conversion, so as to acquire binary information characterizing a measurement time, a measured temperature, and a fiber location.

S4. The data interpretation module converts the binary information into decimal information.

The decimal information includes measured temperature T, fiber location l, and measurement time t.

S5. A spatiotemporal map of a water temperature inside the sewer pipe is drawn based on the decimal information.

Specifically, in step S5, the measured temperature T is drawn in different colors in a coordinate system with the measurement time t as a vertical axis and the fiber location l as a horizontal axis, so as to form the spatiotemporal map of the water temperature inside the sewer pipe. A water temperature matrix corresponding to the spatiotemporal map of the water temperature is as follows:

$$T = \begin{bmatrix} T_{t_1 l_1} & T_{t_1 l_2} & \cdots & T_{t_1 l_m} \\ T_{t_2 l_1} & T_{t_2 l_2} & \cdots & T_{t_2 l_m} \\ \vdots & \vdots & \ddots & \vdots \\ T_{t_n l_1} & T_{t_n l_2} & \cdots & T_{t_n l_m} \end{bmatrix}$$

T: Temperature value measured by an optical fiber (C°);
t: Measurement time (min), t=1, n; and
l: Fiber location (m), l=1, 2, . . . , m.

S6. A background noise value in the spatiotemporal map of the water temperature is eliminated, an abnormal water temperature point is identified, and an inflow and infiltration point of the sewer pipe is determined.

In step S6, the background noise value in the spatiotemporal map of the water temperature is eliminated as follows:

A positive background noise value is set as a° C. (a>0), and is eliminated according to the positive background noise value elimination equation below:

$$X(t, l) = \begin{cases} 1, & T(t, l) - T(t, l-1) \geq a \\ 0, & T(t, l) - T(t, l-1) < a \end{cases}$$

where, t denotes the measurement time; l denotes the fiber location; X(t,l) denotes a positive response event matrix with elements 0 and 1; T(t,l) denotes a water temperature matrix of a temperature measurement point defined by the fiber location l; and T(t,l−1) denotes a water temperature matrix of a temperature measurement point defined by fiber location l−1.

A negative background noise value is set as b° C. (b<0), and is eliminated according to a negative background noise value elimination equation below:

$$X'(t, l) = \begin{cases} -1, & T(t, l) - T(t, l-1) \leq b \\ 0, & T(t, l) - T(t, l-1) > b \end{cases}$$

where, X'(t,l) denotes a negative response event matrix with elements 0 and −1.

The spatiotemporal map of the water temperature is expressed by 0, −1, and 1 after eliminating the positive signal background noise value according to the positive signal background noise value elimination equation and the negative signal background noise value according to the negative signal background noise value elimination equation, where −1 and 1 denote the abnormal water temperature point and an abnormal discharge time, respectively.

In step S6, there are two methods for determining the positive background noise value and the negative background noise value. In a first method, the positive background noise value and the negative background noise value are determined based on a temperature variation amplitude.

$$a = |\overline{T} - T_{max}|$$
$$b = -|\overline{T} - T_{min}|$$

where, $\overline{T}$ denotes an average measured temperature during an observation period; $T_{max}$ denotes a maximum measured temperature during the observation period; and $T_{min}$ denotes a minimum measured temperature during the observation period.

In a second method, the positive background noise value and the negative background noise value are determined based on a probability distribution of a water temperature difference between two adjacent points in space.

$$a = \varphi$$
$$b = -\varphi$$

where, φ denotes a preset background noise value with probability distribution proportion $P_\varphi$ greater than set distribution proportion $P^{set}$ that is, $P_\varphi \omega P^{set}$.

The probability distribution proportion of the preset background noise value is expressed as follows:

$$P_\varphi = \left(\frac{k}{k_{total}}\right) \times 100\%$$

where, k denotes a number of times that an element in temperature difference matrix Γ(t,l−1) appears within (−φ,φ), Γ(t,l−1)=T(t,l)—T(t,l−1); k total denotes a total number of positive and negative temperature differences between two adjacent points in a pipe space during the observation period, $k_{total}$=m×(n−1); m denotes a number of rows in the water temperature matrix T(t,l); and n denotes a number of columns in the water temperature matrix T(t,l).

Figure 4:
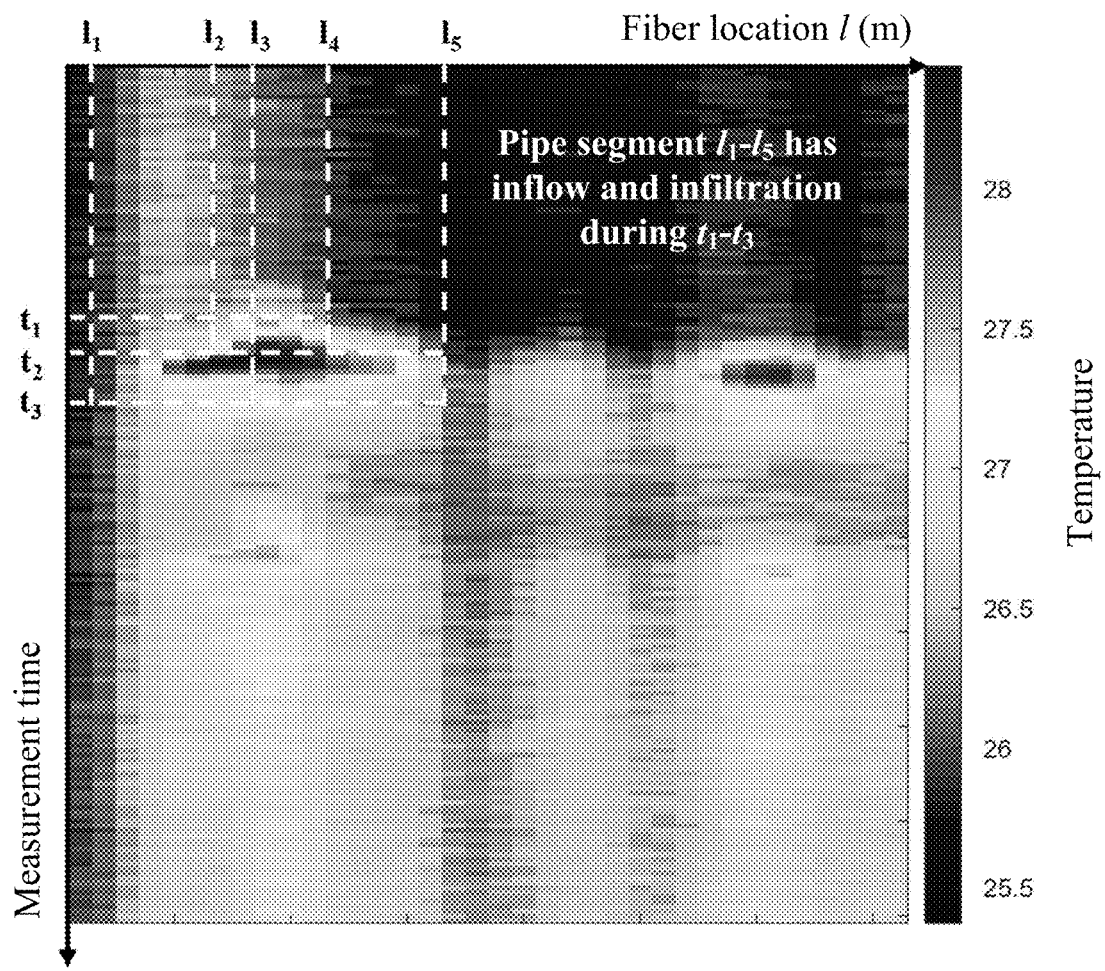
FIG. 4 is a spatiotemporal map of a water temperature inside a sewer pipe according to an embodiment of the present disclosure.
Figure 5:
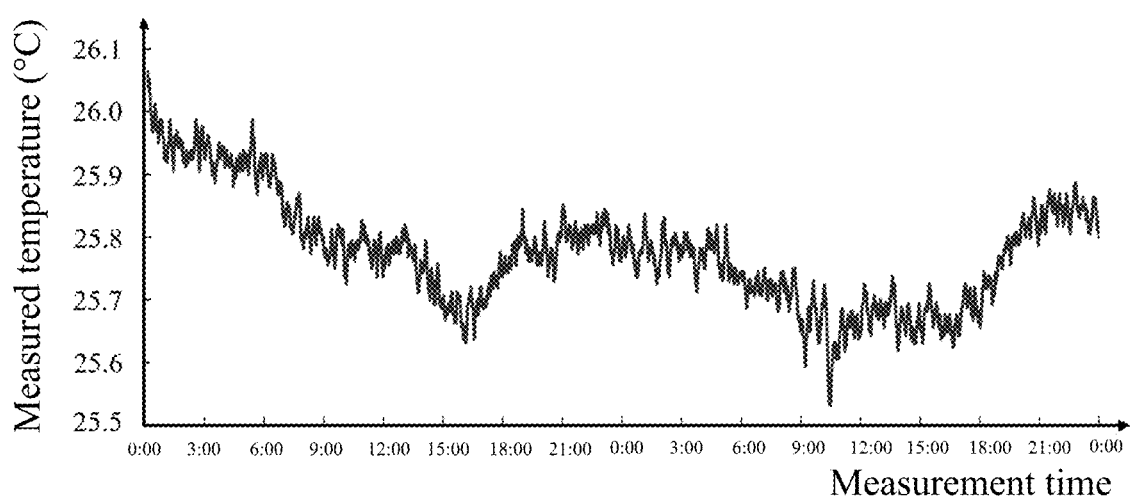
FIG. 5 is a schematic diagram of a water temperature variation at a point inside the sewer pipe during an observation period according to an embodiment of the present disclosure.

In this embodiment, FIG. 4 shows the spatiotemporal map of the water temperature inside the sewer pipe. Based on the spatiotemporal map of the water temperature, the background noise values are eliminated, and the inflow and infiltration point of the sewer pipe is determined. As shown in FIG. 4, according to the first method, during the monitoring period, the sewer pipe has an average water temperature of 25.8° C., a maximum temperature of 26.1° C., a minimum temperature of 25.5° C., a positive background noise value of a=|$\overline{T}$−$T_{max}$|=|25.8−26.1|=0.3° C. and a negative background noise value of b=−|$\overline{T}$−$T_{min}$|=−|25.8−25.5|=−0.3° C.

Figure 6:
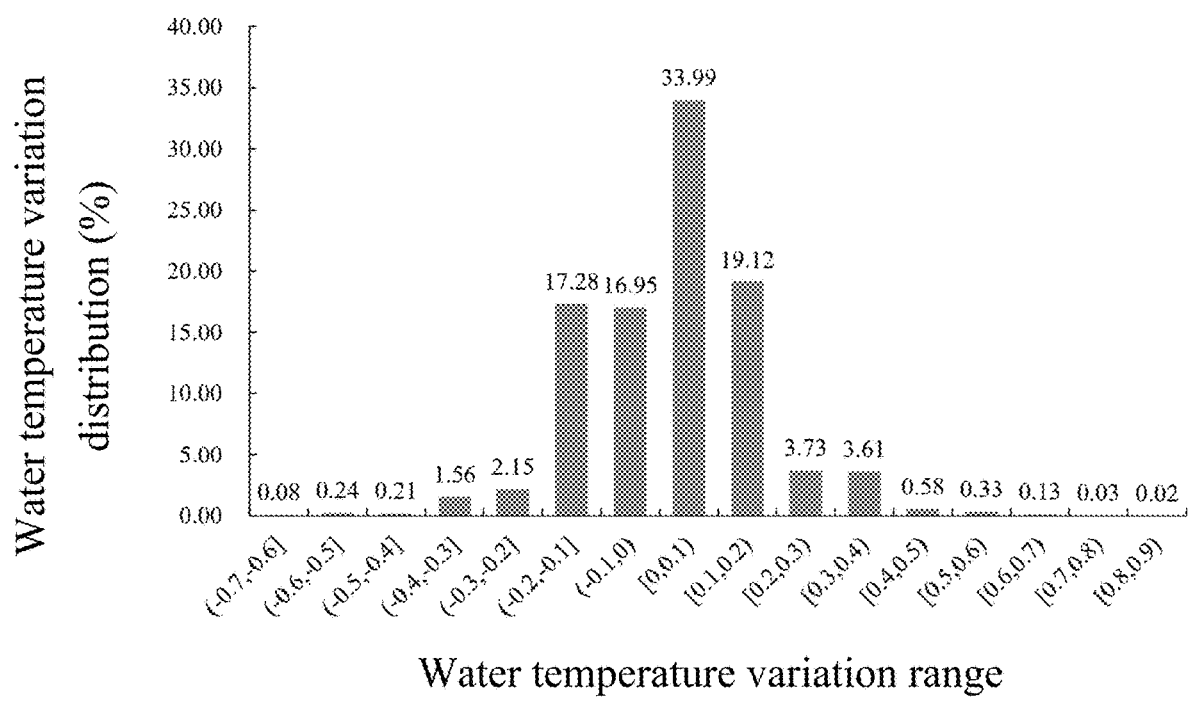
FIG. 6 is a schematic diagram of a probability distribution of the water temperature along the sewer pipe according to an embodiment of the present disclosure.
Figure 7:
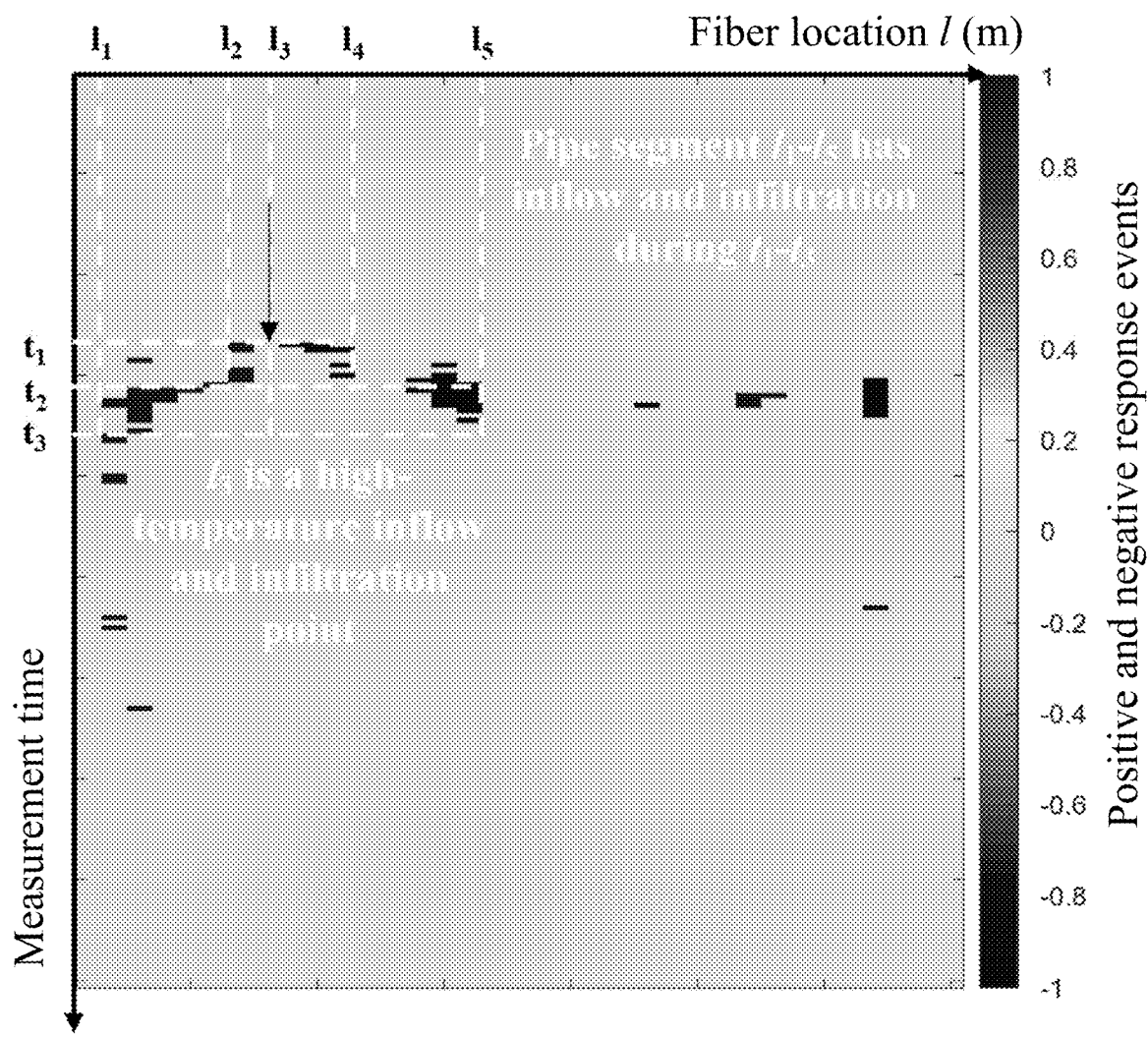
FIG. 7 is a spatiotemporal map of the water temperature inside the sewer pipe after elimination of background noise according to an embodiment of the present disclosure.

FIG. 6 shows a probability distribution of a water temperature variation according to an embodiment of the present disclosure. According to the second method, the observed temperature differences within (−0.4,+0.4) account for 98.4% of the total observed temperature differences. In this embodiment, according to the first method and the second method, the positive background noise value and the negative background noise value are taken as 0.4° C. and −0.4° C., respectively. FIG. 7 shows the spatiotemporal map of the water temperature inside the sewer pipe after the background noise values are eliminated.

In the embodiment of the present disclosure, pipe segment $l_2$-$l_4$ has inflow and infiltration during $t_1$-$t_3$. During $t_1$-$t_2$, the pipe segment $l_2$-$l_4$ has high-temperature inflow and infiltration. There are positive and negative response events occurring in this region, with the positive response event occurring in pipe segment $l_2$-$l_3$ and the negative response event occurring in pipe segment $l_2$-$l_4$. Therefore, it is determined that the inflow and infiltration location is at a junction of the positive and negative response events (values −1 and 1 of the matrix X(t,l)), i.e. $l_3$, which is an indicative of a peak water temperature. As the inflow and infiltration event continues to intensify, the radiation range of the positive and negative response events expands to adjacent locations ($l_2$-$l_1$ and $l_4$-$l_5$) during $t_2$-$t_3$. Expansion boundary $l_1$ is defined by a transition point of values 0 and 1 of matrix X(t,l), and expansion boundary $l_5$ is defined by a transition point of values −1 and 0 of matrix X'(t,l). According to the spatiotemporal map shown in FIG. 4, the water temperature in this part is greater than 28° C. The temperature of the inflow is relatively higher than the average water temperature 26° C. inside the sewer pipe during the monitoring period. If the target pipe is a storm pipe, pipe segment $l_1$-$l_5$ is one where sewage is connected into the storm pipe, and $l_3$ is the sewage connection point.

The above implementations are merely described as examples, and are not intended to limit the scope of the present disclosure. These implementations can also be implemented in various other ways, and various omissions, substitutions, and changes can be made without departing from the technical thought of the present disclosure.

What is claimed is:

1. A sewer pipe inflow and infiltration diagnosis method based on a distributed fiber-optic temperature measurement system, wherein the distributed fiber-optic temperature measurement system comprises an optical time-domain reflectometer, a data interpretation module, a temperature sensing fiber-optic cable, and a distributed fiber-optic temperature measurement instrument, wherein the method comprises the following steps:
S1: transmitting, by the optical time-domain reflectometer, an original optical signal to the temperature sensing fiber-optic cable provided in a sewer pipe;
S2: feeding back, by the temperature sensing fiber-optic cable, a modulated optical signal to the optical time-domain reflectometer due to a temperature effect;
S3: subjecting, by the distributed fiber-optic temperature measurement instrument, the modulated optical signal to photoelectric conversion to acquire binary information characterizing a measurement time, a measured temperature, and a fiber location;
S4: converting, by the data interpretation module, the binary information into decimal information;
S5: drawing a spatiotemporal map of a water temperature inside the sewer pipe based on the decimal information; and
S6: eliminating a background noise value in the spatiotemporal map of the water temperature, identifying an abnormal water temperature point, and determining an inflow and infiltration point of the sewer pipe;
wherein in step S6, the method of eliminating the background noise value in the spatiotemporal map of the water temperature comprises:

setting a positive background noise value a° C. (a>0), and eliminating the positive background noise value according to a positive background noise value elimination equation below:

$$X(t, l) = \begin{cases} 1, & T(t, l) - T(t, l-1) \geq a \\ 0, & T(t, l) - T(t, l-1) < a \end{cases}$$

wherein, t denotes the measurement time; l denotes the fiber location; X(t,l) denotes a positive response event matrix with elements 0 and 1; T(t,l) denotes a water temperature matrix of a temperature measurement point defined by the fiber location l; and T(t,l−1) denotes a water temperature matrix of a temperature measurement point defined by a fiber location l−1;

setting a negative background noise value b° C., b<0, and eliminating the negative background noise value according to a negative background noise value elimination equation below:

$$X'(t, l) = \begin{cases} -1, & T(t, l) - T(t, l-1) \leq b \\ 0, & T(t, l) - T(t, l-1) > b \end{cases}$$

wherein, X'(t,l) denotes a negative response event matrix with elements 0 and −1; and expressing the spatiotemporal map of the water temperature by 0, −1, and 1 after eliminating the positive background noise value according to the positive background noise value elimination equation and the negative background noise value according to the negative background noise value elimination equation, wherein −1 and 1 denote the abnormal water temperature point and an abnormal discharge time, respectively.

2. The sewer pipe inflow and infiltration diagnosis method based on the distributed fiber-optic temperature measurement system according to claim 1, wherein the decimal information comprises the measurement time denoted by t, the measured temperature denoted by T, and the fiber location denoted by l; and step S5 comprises: drawing the measured temperature T in different colors in a coordinate system with the measurement time t as a vertical axis and the fiber location l as a horizontal axis to form the spatiotemporal map of the water temperature inside the sewer pipe.

3. The sewer pipe inflow and infiltration diagnosis method based on the distributed fiber-optic temperature measurement system according to claim 1, wherein step S6 comprises: determining the positive background noise value and the negative background noise value based on a temperature variation amplitude.

4. The sewer pipe inflow and infiltration diagnosis method based on the distributed fiber-optic temperature measurement system according to claim 3, wherein the positive background noise value and the negative background noise value are expressed as follows:

$$a = |\overline{T} - T_{max}|$$
$$b = -|\overline{T} - T_{min}|$$

wherein, $\overline{T}$ denotes an average measured temperature during an observation period; $T_{max}$ denotes a maximum measured temperature during the observation period; and $T_{min}$ denotes a minimum measured temperature during the observation period.

5. The sewer pipe inflow and infiltration diagnosis method based on the distributed fiber-optic temperature measurement system according to claim 1, wherein step S6 comprises: determining the positive background noise value and the negative background noise value based on a probability distribution of a water temperature difference between two adjacent temperature measurement points in space.

6. The sewer pipe inflow and infiltration diagnosis method based on the distributed fiber-optic temperature measurement system according to claim 5, wherein the positive background noise value and the negative background noise value are expressed as follows:

$$a = \varphi$$
$$b = -\varphi$$

wherein, φ denotes a preset background noise value with a probability distribution proportion $P_\varphi$ greater than a set distribution proportion $P^{set}$, that is, $P_\varphi \geq P^{set}$.

7. The sewer pipe inflow and infiltration diagnosis method based on the distributed fiber-optic temperature measurement system according to claim 6, wherein the probability distribution proportion of the preset background noise value is expressed as follows:

$$P_\varphi = \left(\frac{k}{k_{total}}\right) \times 100\%$$

wherein, k denotes a number of times that an element in a temperature difference matrix Γ(t,l−1) appears within (−φ,φ), Γ(t,l−1)=T(t,l)—T(t,l−1); $k_{total}$ denotes a total number of positive and negative temperature differences between the two adjacent temperature measurement points in a pipe space during the observation period, $k_{total}$=m×(n−1); m denotes a number of rows in the water temperature matrix T(t,l); and n denotes a number of columns in the water temperature matrix T(t,l).

8. The sewer pipe inflow and infiltration diagnosis method based on the distributed fiber-optic temperature measurement system according to claim 1, wherein the optical time-domain reflectometer comprises an optical signal transmitting module and an optical signal receiving module; the optical signal transmission module is configured to generate and transmit the original optical signal to the temperature sensing fiber-optic cable; and the optical signal receiving module is configured to receive the modulated optical signal from the temperature sensing fiber-optic cable.

9. The sewer pipe inflow and infiltration diagnosis method based on the distributed fiber-optic temperature measurement system according to claim 1, wherein the sewer pipe comprises a storm pipe, a sewage pipe, and a storm and sewage combined pipe.

* * * * *